US008443014B2

(12) United States Patent
Enenkiel

(10) Patent No.: US 8,443,014 B2
(45) Date of Patent: May 14, 2013

(54) COMPUTER SYSTEMS AND DATA PROCESSING METHODS FOR USING A WEB SERVICE

(75) Inventor: Achim Enenkiel, Karlsruhe (DE)

(73) Assignee: SAP AG, Walldorf (DE)

( * ) Notice: Subject to any disclaimer, the term of this patent is extended or adjusted under 35 U.S.C. 154(b) by 1737 days.

(21) Appl. No.: 11/165,342

(22) Filed: Jun. 24, 2005

(65) Prior Publication Data
US 2006/0004771 A1  Jan. 5, 2006

(30) Foreign Application Priority Data
Jun. 29, 2004 (EP) .................................... 04015199

(51) Int. Cl.
G06F 12/00 (2006.01)
G06F 15/16 (2006.01)
G06F 17/30 (2006.01)
G06F 7/00 (2006.01)

(52) U.S. Cl.
USPC ........................... 707/899; 707/791; 707/736

(58) Field of Classification Search .................. 707/899, 707/791, 736
See application file for complete search history.

(56) References Cited

U.S. PATENT DOCUMENTS

| 6,941,282 | B1 * | 9/2005 | Johnson | 705/44 |
| 7,342,918 | B2 * | 3/2008 | Keenan et al. | 370/352 |
| 2002/0016769 | A1 * | 2/2002 | Barbara et al. | 705/40 |
| 2002/0198829 | A1 * | 12/2002 | Ludwig et al. | 705/40 |
| 2003/0004874 | A1 * | 1/2003 | Ludwig et al. | 705/40 |
| 2003/0018661 | A1 | 1/2003 | Darugar | |
| 2003/0028451 | A1 * | 2/2003 | Ananian | 705/27 |
| 2003/0028484 | A1 * | 2/2003 | Boylan et al. | 705/40 |
| 2003/0055624 | A1 | 3/2003 | Fletcher et al. | |
| 2003/0055868 | A1 | 3/2003 | Fletcher et al. | |
| 2003/0093436 | A1 | 5/2003 | Brown et al. | |
| 2003/0110242 | A1 | 6/2003 | Brown et al. | |
| 2003/0126094 | A1 * | 7/2003 | Fisher et al. | 705/75 |
| 2003/0135628 | A1 * | 7/2003 | Fletcher et al. | 709/229 |
| 2003/0163513 | A1 | 8/2003 | Schaeck et al. | |
| 2003/0187841 | A1 | 10/2003 | Zhang et al. | |
| 2004/0003130 | A1 | 1/2004 | Becker et al. | |
| 2004/0045005 | A1 | 3/2004 | Karakashian | |
| 2004/0064503 | A1 | 4/2004 | Karakashian et al. | |
| 2004/0093515 | A1 | 5/2004 | Reeves, Jr. | |
| 2004/0117320 | A1 * | 6/2004 | Morioka et al. | 705/76 |
| 2005/0044197 | A1 * | 2/2005 | Lai | 709/223 |
| 2005/0187873 | A1 * | 8/2005 | Labrou et al. | 705/40 |

FOREIGN PATENT DOCUMENTS

EP    1282089 A1    2/2003

OTHER PUBLICATIONS

European Search Report, dated Dec. 15, 2004, 7 pages.
Carlos C. Tapang, "Web Services Description Language (WSDL) Explained," dated Jul. 2001 (32 pages).

(Continued)

*Primary Examiner* — Robert Beausoliel, Jr.
*Assistant Examiner* — Hexing Liu
(74) *Attorney, Agent, or Firm* — Finnegan, Henderson, Farabow, Garrett & Dunner LLP

(57) ABSTRACT

Data processing systems and methods are disclosed that utilize the Home Banking Computer Interface (HBCI) protocol for secure communication with a web service. Usage of the HBCI protocol protects the communication of a requester with the web service against eavesdropping and tampering. Further, implementation of a dual control business procedure is facilitated.

12 Claims, 4 Drawing Sheets

OTHER PUBLICATIONS

Erik Christensen et al., "Web Services Description Language (WSDL) 1.1," W3C Note, dated Mar. 15, 2001, retrieved from http://www.w3.org/TR/wsdl.html (51 pages).

Jürgen Mauerer, "SOAP, UDDI und WSDL," published Feb. 19, 2004 (2 pages).

Dominik Kaspar et al., "UDDI Seminar Presentation," dated May 6, 2003 (19 pages).

"Data Structures," UDDI Version 2.0 (18 pages).

Chris Peiris, "Programmierungsmodell for die UDDI-Laufzeit," published Feb. 5, 2003 (23 pages).

OASIS UDDI Home page, retrieved on Sep. 22, 2005, from http://www.uddi.org/ (1 page).

"Extensible Markup Language (XML) 1.0 (Third Edition), W3C Recommendation," Feb. 4, 2004, retrieved from http://www.w3.org/TR/REC-xml (56 pages).

"The Adobe XML Architecture," retrieved on Sep. 22, 2005, from http://www.adobe.com/enterprise/xml.html (3 pages).

* cited by examiner

COMPUTER SYSTEMS AND DATA PROCESSING METHODS FOR USING A WEB SERVICE

DESCRIPTION OF THE INVENTION

1. Field of the Invention

The present invention generally relates to the field of data processing systems and related methods. More particularly, the invention relates to the usage of web services.

2. Background of the Invention

Web services make software functionality available over the Internet so that an application program may make a request to a program running on another server, i.e., a web service, and use that program's response for further processing by the application.

A disadvantage of using web services is that request parameter data to be processed by the web service, as well as the web service's response is transmitted over a public network, i.e., the Internet, which limits the usage of web services to non-confidential applications and applications where protection against eavesdropping, fraud, and tampering is not required.

Web services may be informational or transactional. That is, some web services provide information of interest to the requester, while other web services may actually lead to the invocation of business procedures. Examples of publicly available web services today include stock quote services, services to retrieve news from web news sources, and currency conversion services. For more detailed information on web services technology, reference is made to the following:

- "Web Services Description Language (WSDL) Explained," dated July 2001, by Carlos C. Tapang;
- "Web Services Description Language (WSDL) 1.1," W3C Note, dated Mar. 15, 2001, by Erik Christensen et al.;
- "SOAP, UDDI and WSDL (SOAP, UDDI and WSDL)," published Feb. 19, 2004, by Jürgen Mauerer;
- "UDDI Seminar Presentation," dated May 6, 2003, by Dominik Kaspar et al.;
- "Data Structures," UDDI Version 2.0; and
- "Programmierrungsmodell für die UDDI-Laufzeit (Programming Model for UDDI Runtime), published Feb. 5, 2003, by Chris Peiris.

One example of web services is the services responsive to Simple Object Access Protocol (SOAP) messages. SOAP is an application invocation protocol that defines a protocol for exchanging information encoded as XML messages. Normally, these services are described by WSDL (Web Service Description Language) notation stored in WSDL documents. A WSDL document may be stored in numerous ways such as in a file, in a DB2 XML registry/repository, or in a DB2 based UDDI registry, for example. UDDI (Universal Description, Discovery, Integration) is a protocol for describing web services such that interested parties may easily discover them. Specifications for this registry and use of WSDL in the registry are available at http://www.uddi.org/. Service providers may register their services in a UDDI, specifying technical information about how to invoke the service. Often a WSDL document is stored in a UDDI registry in order to define the messages a particular web service accepts and generates.

The design of UDDI allows enterprises that own web service enabled applications to publish data about themselves and their services. By providing this information, UDDI implements a simplified form of searching for those interested in locating a particular service in which to fulfill an application process. The conventional UDDI search is focused on single search criteria, such as business name, business location, business categories, business identifier, service type by name, and discovery URL (Uniform Resource Locator).

Various approaches for implementing web services are known, such as that disclosed by U.S. Patent Publication Nos. 2003/0093436A1, 2003/0055868A1, 2003/0055624A1, 2003/0018661A1, 2003/0110242A1, 2003/0163513A1, 2004/0064503A1, 2004/0045005A1, 2004/0003130A1, 2003/0187841A1.

SUMMARY OF THE INVENTION

Embodiments consistent with the present invention may provide a computer system with means for generating a request. The request may include request parameter data to be processed by a web service. For example, the request parameter data may specify a database query to be performed by the web service in order to provide a set of information of interest to the requester.

In one embodiment, the computer system includes means for generating a Home Banking Computer Interface (HBCI) message in response to the request. The HBCI message contains the request parameter data. HBCI has been developed by an association of German banks and is nowadays, a standard for online banking in Germany. HBCI uses the European Conference of Posts and Telecommunications (CEPT) protocol and Einheitliche Hohere Kommunikations Protokoll (EHKP) as transport frame for transparent data up to 1600 Byte accompanied by Bildschirmtext File Interchange Format (BtxFIF) for data larger than 1600 Byte. For Internet clients, HBCI additionally uses the Transmission Control Protocol/Internet Protocol (TCP/IP). TCP-Port 3000 serves as interface between application and communication. HBCI utilizes a data format based on the United Nations Electronic Data Interchange For Administration, Commerce and Transport (UN/EDIFACT), which is used also for internal data transfer at the banks.

A benefit of HBCI is its high level of end-to-end security even over an open network as the Internet, because the HBCI standard fulfils the requirements of authentication of the user to the user terminal, e.g., by entering a password, mutual authentication of the user terminal and the banking system, non-repudiation of origin, integrity, encryption, and validity check in order to prevent a replay attack.

Two different security solutions are offered in HBCI. The first one is a solution named DES-DES-Verfahren (DDV), based on a symmetric Data Encryption Standard (DES) method employing a chip card. The second solution is the RSA-DES-Verfahren (RDV), based on an asymmetric Rivest, Shamir and Adleman (RSA) algorithm. In the DDV solution, an electronic context signature is established in detail by first hashing the message via 160-bit cryptographic hash function (RIPEMD-160), followed by a padding of the hash value to a length equalizing the next multiple of 8 byte by adding "00", and finally building a retail Cipher Block Chaining Message Authentication Code (CBC-MAC) according to American National Standards Institute (ANSI) X9.19 standard using the 2-Key-Triple DES encryption method.

In the RDV solution, the electronic signature is established by the same hashing procedure as in DDV. In addition, the hash value is formatted and finally signed via RSA algorithm following International Standards Organization (ISO) 9796: 1991 standard. Encryption of the message content is achieved in both security solutions via 2-Key-Triple-DES according to ANSI X3.92 standard using a specific session key.

For each message, a new session key is generated dynamically by the sending system. The session key itself is encrypted according to DDV or RDV and accompanies each message. At the receiving party, the authentication takes place by checking the electronic signature with the secret or public key of the sending party according to DDV or RDV, respectively. Validity is achieved via the implementation of a sequence counter in the banking system as well in the user terminal combined with a history function, e.g., a list of previously executed sequences.

Further, computer systems consistent with the embodiments of the present invention may comprise means for generating a SOAP envelope that contains the HBCI message. The SOAP envelope may be sent to the web service via a computer network, such as the Internet. In response, the computer system receives a SOAP envelope containing the web service's response.

An advantage of embodiments of the present invention is that they may protect the confidentiality of request parameter data that is sent from the requester's computer to the web service via a public network. Further, usage of HBCI protects against tampering and fraud. This enables usage of web services for a new field of applications. For example, a web service offers business intelligence data regarding the credit worthiness of companies.

A database query that is sent as a request from the requester to the web service may be of a highly confidential nature, as it contains request parameter data descriptive of the business intelligence data of the requester, that might be of interest to a requester's competitor. In accordance with one embodiment of the present invention, the request is protected by the HBCI protocol against eavesdropping, tampering, and manipulation.

Another example is a web service that offers technical data, such as a patent database. A database query specified in the request may be of a highly confidential nature as it circumscribes a technical field of current interest of the requester. Again, this highly confidential information is protected by means of HBCI.

In accordance with another embodiment of the invention, the HBCI message is digitally signed by means of the requester's private key. For implementation of the principle of dual control, the HBCI message may be digitally signed again by means of the private key of a supervisor. The supervisor's digital signature of the HBCI message certifies that the supervisor has verified the requester's digital signature and that the request is authorized.

In accordance with a further embodiment of the invention, the requester and the supervisor need to be present at the same client computer system for digitally signing the HBCI message. For example, the client computer includes two chip card readers and both the requester and the supervisor need to insert their respective integrated circuit chip cards into the card readers that store the respective keys. Alternatively, the requester and the supervisor use different client computers. In this instance, the digitally signed HBCI message is transmitted over a private network from the requester's computer to the supervisor's computer. The supervisor verifies the digital signature of the HBCI message and signs the signed HBCI message by means of his or her private key. The HBCI message with the two digital signatures is transmitted from the supervisor's computer to the web service in a SOAP envelope. In addition, an acknowledgement is sent from the supervisor's computer to the requester's computer in order to inform the requester that his or her request has been approved by the supervisor and has been forwarded to the web service. The web service's response is directly sent to the requester's computer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

In the following, exemplary embodiments of the invention will be describe in greater detail by making reference to the drawings in which.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
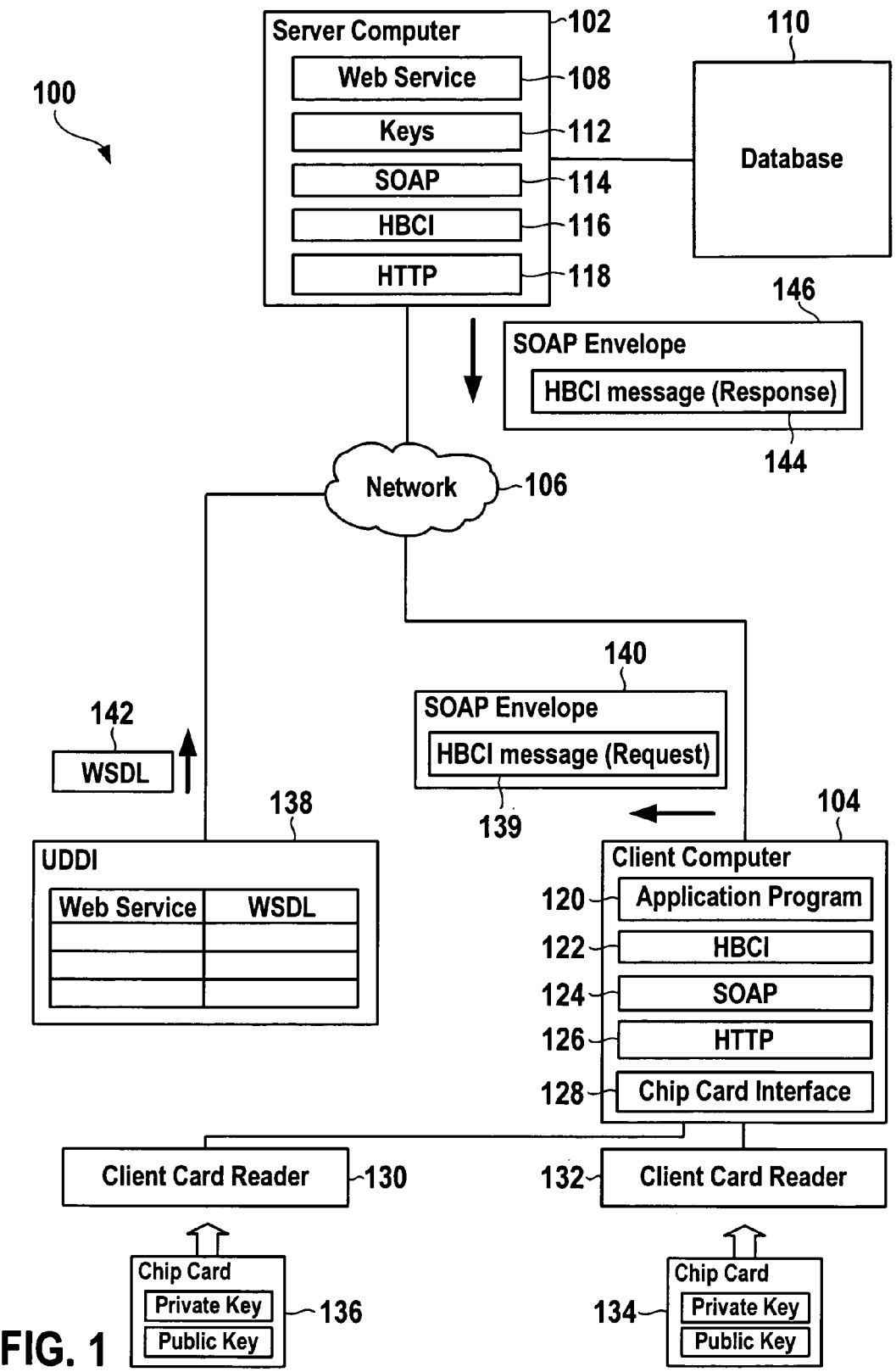
FIG. 1 illustrates a block diagram of a first exemplary embodiment of a data processing system, consistent with the invention.

FIG. 1 shows an exemplary data processing system 100 that includes a server computer 102 and a client computer 104. The client computer 104 is coupled to the server computer 102 via a computer network 106, such as the Internet.

The server computer 102 runs a program that provides a web service 108. For example, the web service 108 may be of an informational nature. It uses the relational database 110 that is coupled to server computer 102 to provide information in response to a request that specifies a database query.

The server computer 102 includes storage 112 for storing its own private keys and public keys of potential requesters. Alternatively, the public keys are not stored by the server computer 102 but in a central database that may be accessed by the server computer 102 over the Internet 106 in order to obtain a required public key.

Program module 114 of server computer 102 implements the SOAP protocol, program module 116 implements the HBCI protocol, and program module 118 implements the hypertext transfer protocol (HTTP).

The client computer 104 executes an application program 120, a program module 122 implementing the HBCI protocol, a program module 124 implementing the SOAP protocol, and a program module 126 implementing the HTTP protocol. Further, the client computer 104 includes an interface 128 for coupling the client computer 104 to one or more integrated circuit chip card readers. In the exemplary embodiment considered here, two integrated circuit chip card readers 130 and 132 are coupled to client computer 104. The card readers 130, 132 may receive respective chip cards 134, 136 that store at least the private key. The client computer 104 may access the UDDI 138 via the Internet 106. The UDDI 138 contains a list of web services including web service 108, and the respective WSDL files that describe the registered web services.

In operation, a user starts the application program 120 and inserts his or her chip card 134 into the card reader 132. The user has the role of a requester and at least his or her private key is stored on the chip card 134. The requester enters parameter data into the application program in order to specify a query to be performed by the web service 108. In response, the application program 120 generates a request that contains the parameter data.

This invokes the program module 122, which generates an HBCI message containing the parameter data using the chip card 134 and the private key that is stored on chip card 134. The HBCI message is put into a SOAP envelope 140 by program module 124 and is sent by program module 126 to the server computer 102 as an HTTP request. The program module 124 may transform the HBCI message into an XML file, in accordance with a WSDL file 142 the client computer 104 has received from UDDI 138. In one embodiment, the WSDL file 142 describes the web service 108.

Server computer 102 receives the SOAP envelope 140 over network 106 (e.g., the Internet) using its program module 118. The SOAP envelope 140 is opened by program module 114 and the program module 116 is invoked in order to read the HBCI message containing the parameter data. The parameter data is entered into the web service 108. In response, the web service 108 performs a database query on database 110. The result of the database query is put into an HBCI message 144 containing the query response. The HBCI message 144 is generated using the web service's private key stored in storage 112. Program module 114 puts the HBCI message 144 into a SOAP envelope 146 that is sent as an HTTP response to client computer 104 using program module 118.

The client computer 104 receives the SOAP envelope 146 using its program module 126. The SOAP envelope 148 is opened by program module 124 and the HBCI message 144 contained in the SOAP envelope 146 is decrypted by means of program module 122. The response contained in the HBCI message 144 is entered into the application program 120 for further processing.

Some requests may be classified as requiring a supervisor's approval. For example, if the requester enters corresponding request parameter data into application program 120, the supervisor also needs to insert his or her chip card 136 into the card reader 130. The program module 122 uses the chip card 134 of the requester to digitally sign the HBCI message 139. Further, the program module 122 uses the chip card 136 of the supervisor to digitally sign the HBCI message 139 by means of the supervisor's private key stored on the chip card 136. For example, the HBCI message 139 is digitally signed with the requester's private key and the resultant digital signature is signed again using the supervisor's private key. The resultant HBCI message 139 containing the two signatures is then put into the SOAP envelope 140.

Figure 2:
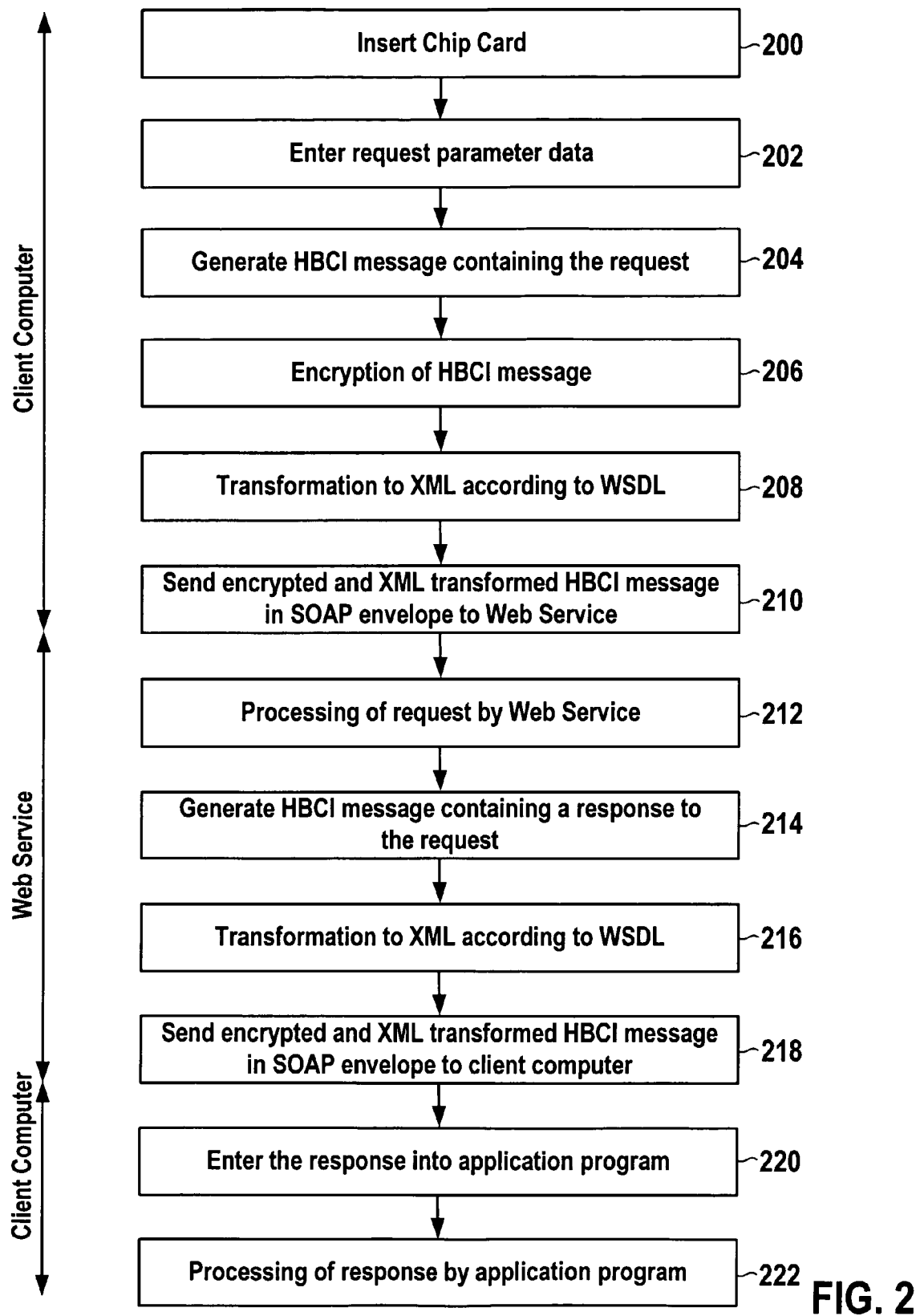
FIG. 2 illustrates a flowchart of an exemplary mode of operation of a data processing system, consistent with the invention.

FIG. 2 shows a flowchart of an exemplary method for a request that does not require supervisor approval. In step 200, the requester inserts his or her chip card into the card reader coupled to the client computer. In step 202, the requester enters request parameter data, e.g., data that specifies a database query to be performed by the web service. In step 204, an HBCI message is generated that contains the request parameter data. The HBCI message is encrypted in step 206 in accordance with the HBCI protocol and transformed to an XML file in accordance with the WSDL file 142 of the web service that is to carry out the database query as requested (step 208).

In step 210, the encrypted and XML transformed HBCI message is sent in a SOAP envelope to the web service. In step 212, the request, as specified by the request parameter data, is processed by the web service. In the example considered here, the web service performs a query on its relational database in order to retrieve the information of interest to the requester, as specified by the request parameter data.

In step 214, an HBCI message is generated by the server computer. The HBCI message contains the response to the request. In the example considered here, the response is the result of the database query performed by the web service (step 214). In step 216, the HBCI message is transformed into an XML format in accordance with the WSDL file of the web service. In step 218, the encrypted and XML transformed HBCI message is sent in a SOAP envelope to the client computer of the requester.

Upon receipt of the SOAP envelope from the server computer, the client computer enters the response received in the SOAP envelope into an application program (step 220) for further processing by the application program (step 222). An advantage of this embodiment is that both the HBCI message containing the request and the HBCI message containing the response is protected against eavesdropping and tampering.

Figure 3:
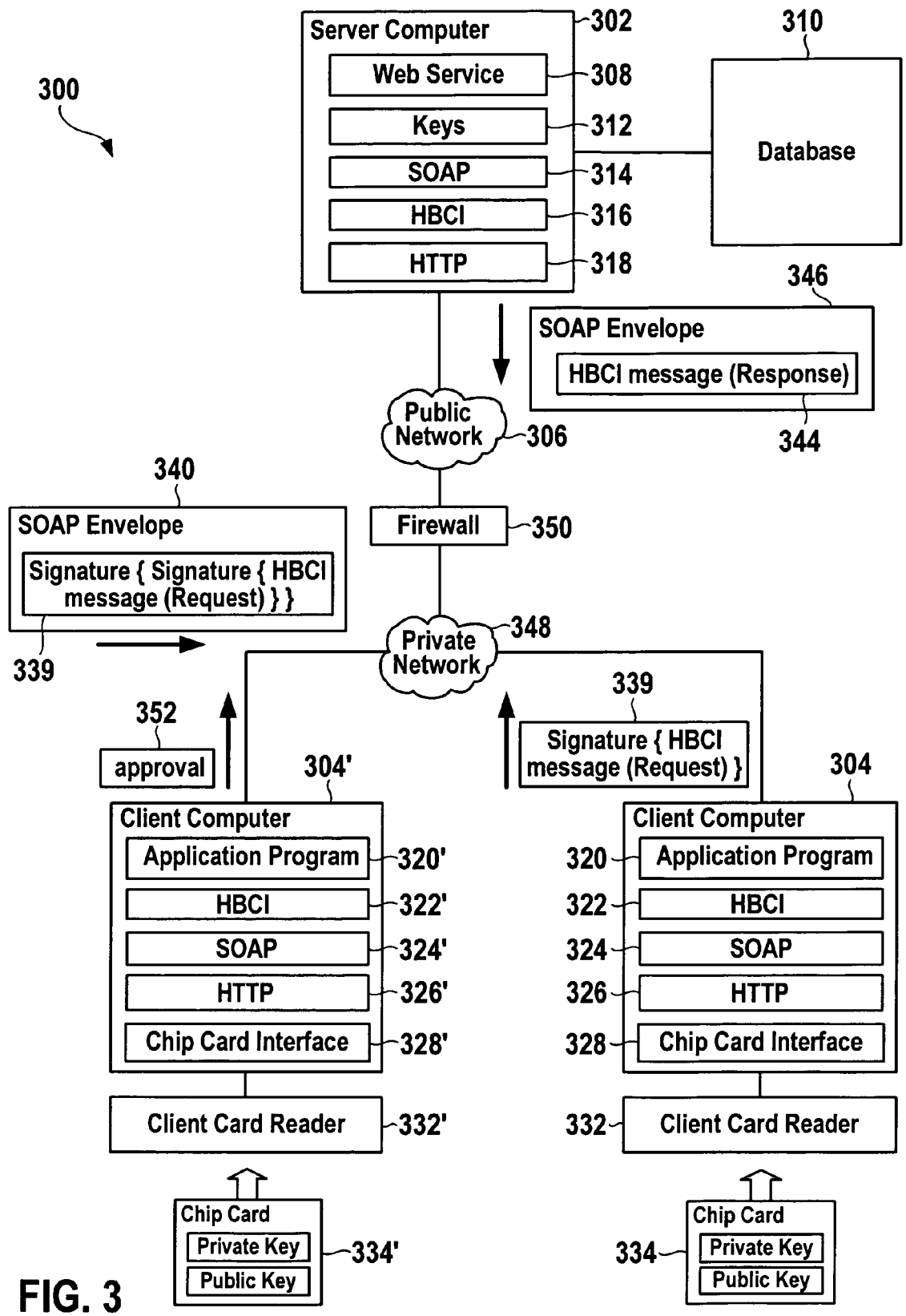
FIG. 3 illustrates a block diagram of a second exemplary embodiment of a data processing system, consistent with the invention.

FIG. 3 illustrates a further embodiment of a data processing system, consistent with the invention. Elements of the embodiment of FIG. 3 that correspond to elements in the embodiment of FIG. 1 are designated by like reference numerals having added 200.

In the embodiment shown in FIG. 3, a client computer 304 of a requester and a client computer 304' of a supervisor are coupled by a private network 348, such as a company intranet. The client computers 304 and 304' are of a similar design as client computer 104 of FIG. 1. Both client computers 304 and 304' include chip card readers 332 and 332', for the corresponding requester's chip card 334 and the supervisor's chip card 334'. The intranet 348 is coupled via a public network 306, e.g., the Internet, to the server computer 302 that provides the web service 308.

In operation, the requester starts the application program 320, and enters request parameter data and inserts his or her chip card 334 into the chip card reader 332. In response, an HBCI message is generated according to the same procedure as in the embodiment of FIG. 1 (cf. steps 200 to 204 in the embodiment of FIG. 2). The resultant HBCI message 339 is signed with the requester's digital signature using the requesters private key stored on his or her chip card 334.

The HBCI message 339 is transmitted via the intranet 348 to the client computer 304' for approval by the supervisor. By means of the application program 120' the supervisor verifies the signature of the HBCI message 339. For approval of the HBCI message the supervisor signs the signed HBCI message another time with his or her private key stored on chip card 334'. The resultant HBCI message 339 that has been digitally signed twice is put into the SOAP envelope 340 and sent to the server computer 302 via intranet 348, firewall 350, and Internet 306. Upon receipt of SOAP envelope 340, the server computer 302 verifies both digital signatures of HBCI message 339. If the verification is successful, the request contained in the HBCI message is processed and a response is sent back to the client computer 304 of the requester in SOAP envelope 346.

An advantage of this embodiment is that it facilitates the implementation of a dual control business process. For example, processing of the request by the web service 308 costs a substantial fee. In order to control the expenditure, the requester needs his or her supervisor's approval. Preferably, if the supervisor has approved and digitally signed the HBCI message 339, an approval message 352 is sent from the client computer 304' via intranet 348 to the client computer 304 in order to inform the requester that his or her request has been approved and sent to the web service for processing.

Figure 4:
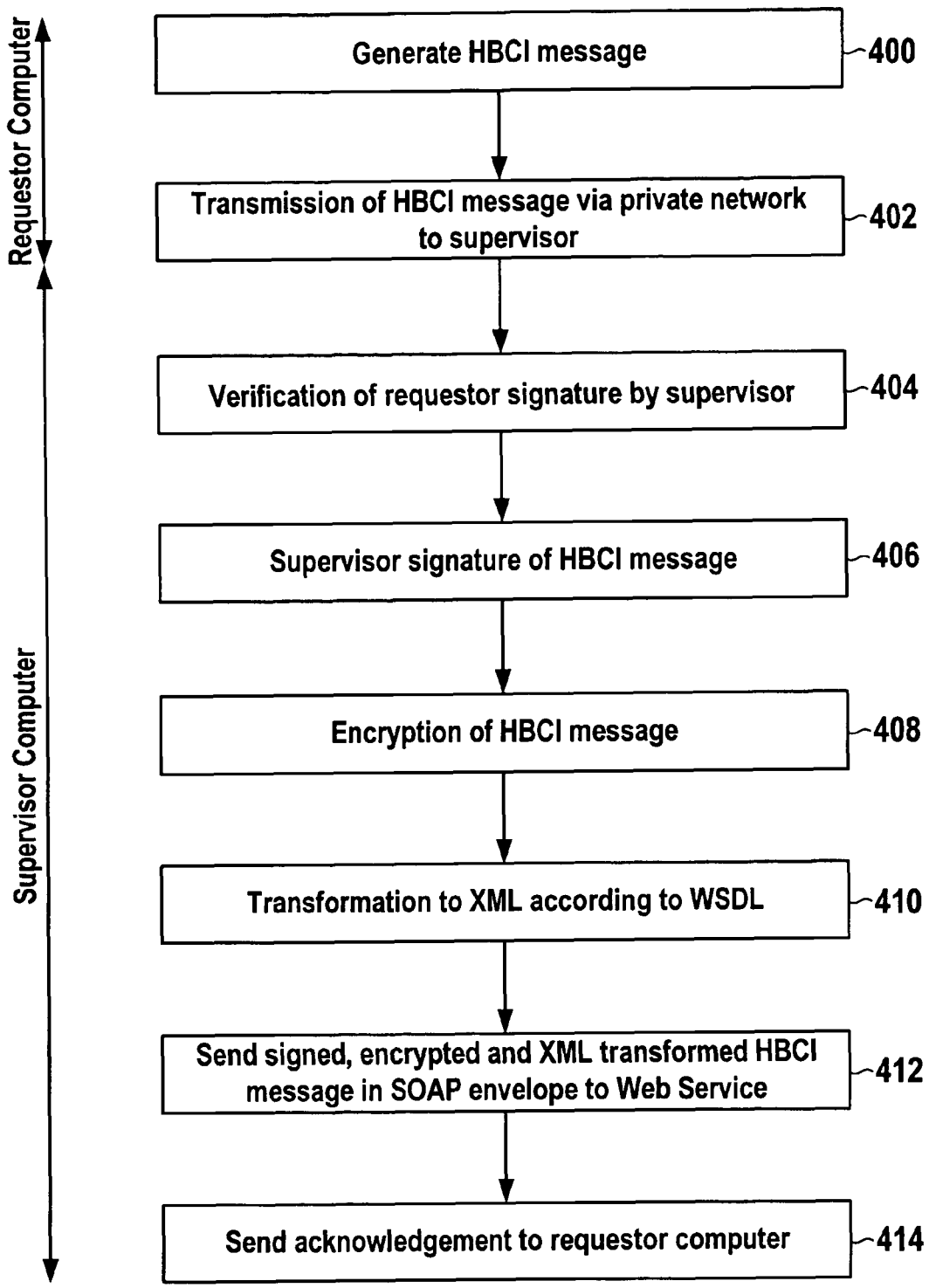
FIG. 4 illustrates a flowchart of an exemplary mode of operation of a data processing system, consistent with the invention.

FIG. 4 shows a flowchart of an exemplary a mode of operation that may be implemented with, for example, the data processing system 300 of FIG. 3. In step 400, an HBCI message is generated in response to a requester's input of request parameter data. The HBCI message is digitally signed with the requester's digital signature. In step 402, the digitally signed HBCI message is transmitted via a private network to a supervisor's computer.

In step 404, the supervisor verifies the digital signature of the HBCI message. After successful verification of the requester's signature by the supervisor, the supervisor may review the request contained in the HBCI message and sign the HBCI message with his or her private key in step 406, in order to express his or her approval. The HBCI message that has been digitally signed twice is encrypted in step 408 and transformed to an XML format according to the WSDL file that describes the web service that is to perform the processing of the request (step 410).

In step 412, the resultant HBCI message with the two digital signatures is sent to the web service in an SOAP envelope. In addition, an acknowledgement is sent to the requester's computer in step 414 in order to signal the supervisor's approval of the request and the sending of the request from the supervisor's client computer to the web service.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer system, comprising:
   at least one memory device for storing executable program instructions; and
   at least one processor for executing the program instructions to:
   generate a request from a first party, the request containing request parameter data to be processed by a web service;
   generate a Home Banking Computer Interface (HBCI) message containing the request parameter data in response to the request and digitally sign the HBCI message using a private key of the first party;
   transmit the signed HBCI message to a second party, wherein the second party digitally signs the HBCI message using a private key of the second party after the signature of the first party is verified;
   generate a first Simple Object Access Protocol (SOAP) envelope containing the HBCI message digitally signed by the first party and the second party;
   send the first SOAP envelope to the web service; and
   provide to the first party a second SOAP envelope containing a web service response from the web service.

2. The computer system of claim 1, wherein the request from the first party is generated by an application program and wherein the request parameter data is user data for specifying a query to be performed by the web service.

3. The computer system of claim 1, wherein the executable program instructions to generate the SOAP envelope further comprise executable program instructions to transform the HBCI message to an extended mark-up language (XML) file in accordance with a web service description language (WSDL) file being descriptive of the web service.

4. The computer system of claim 1, wherein the executable program instructions to generate the HBCI message further comprise executable program instructions to provide an interface to a data carrier.

5. The computer system of claim 4, wherein the data carrier is one of an integrated circuit chip card, a magnetic data carrier, and an optical data carrier.

6. In a data processing system, comprising, a computer system, a web service for processing request parameter data received with a first SOAP envelope, and means for generating a second SOAP envelope containing a web service response, the computer system comprising:
   at least one memory device for storing executable program instructions; and
   at least one processor for executing the program instructions to:
   generate a request from a first party, the request containing request parameter data to be processed by a web service;
   generate a Home Banking Computer Interface (HBCI) message containing the request parameter data in response to the request and digitally sign the HBCI message using a private key of the first party;
   transmit the signed HBCI message to a second party, wherein the second party digitally signs the HBCI message using a private key of the second party after the signature of the first party is verified;
   generate a first Simple Object Access Protocol (SOAP) envelope containing the HBCI message digitally signed by the first party and the second party;
   send the first SOAP envelope to the web service; and
   provide to the first party a second SOAP envelope containing a web service response from the web service.

7. A data processing system, comprising:
   (a) a first computer system comprising:
   means for generating a request from a first party, the request containing request parameter data to be processed by a web service;
   means for generating a HBCI message in response to the request, the HBCI message containing the request parameter data;
   means for digitally signing the HBCI message by means of a private key of the first party; and
   means for receiving a web service response; and
   (b) a second computer system comprising:
   means for receiving the signed HBCI message from the first computer system;
   means for verifying the digital signature of the signed HBCI message;
   means for digitally signing the signed HBCI message by means of a private key of a second party after the signature of the first party is verified;
   means for generating a first SOAP envelope containing the HBCI message with the first party's and second party's digital signatures; and
   means for sending the SOAP envelope to the web service;
   wherein the first and second computer systems are coupled by a private network.

8. The data processing system of claim 7, wherein the first and second computer systems are coupled to the web service via the private network and a public network, and further wherein the private network and the public network are separated by a firewall.

9. A data processing method, comprising:
- generating a request from a first party, the request containing request parameter data to be processed by a web service;
- generating a Home Banking Computer Interface (HBCI) message containing the request parameter data in response to the request and for digitally signing the HBCI message using a private key of the first party;
- transmitting the signed HBCI message to a second party, wherein the second party digitally signs the HBCI message using a private key of the second party after the signature of the first party is verified;
- generating a first Simple Object Access Protocol (SOAP) envelope containing the HBCI message digitally signed by the first party and the second party;
- sending the first SOAP envelope to the web service; and
- receiving by the first party a second SOAP envelope containing a web service response from the web service.

10. The data processing method of claim 9, wherein the request from the first party is generated by an application program and further wherein the request parameter data is user data for specifying a query to be performed by the web service.

11. The data processing method of claim 9, further comprising transforming the HBCI message to an XML format in compliance with a WSDL file being descriptive of the web service.

12. A computer program product stored on a computer-readable storage medium for performing, when executed by a processor, a data processing method, the method comprising:
- receiving a request from a first party containing request parameter data;
- generating a Home Banking Computer Interface (HBCI) message containing the request parameter data in response to the request and for digitally signing the HBCI message using a private key of the first party;
- transmitting the signed HBCI message to a second party, wherein the second party digitally signs the HBCI message using a private key of the second party after the signature of the first party is verified;
- generating a first Simple Object Access Protocol (SOAP) envelope containing the HBCI message digitally signed by the first party and the second party;
- sending the first SOAP envelope to the web service; and
- receiving by the first party a second SOAP envelope containing a web service response from the web service.

* * * * *